US007454881B2

United States Patent

(12) United States Patent
Hanatani et al.

(10) Patent No.: US 7,454,881 B2
(45) Date of Patent: Nov. 25, 2008

(54) METHOD OF SEALING A CYLINDRICAL INLET OF A BAG

(75) Inventors: Shinya Hanatani, Numazu (JP); Moriaki Saito, Fuji (JP); Masami Iguchi, Suntou-gun (JP); Hideki Satoh, Numazu (JP); Shigeo Hatada, Numazu (JP); Michio Urata, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/556,135

(22) Filed: Nov. 2, 2006

(65) Prior Publication Data

US 2007/0095023 A1 May 3, 2007

(30) Foreign Application Priority Data

Nov. 2, 2005 (JP) ............................ 2005-319173

(51) Int. Cl.
*B65B 3/04* (2006.01)
*B65B 7/02* (2006.01)
*B65B 51/10* (2006.01)

(52) U.S. Cl. ............................ 53/469; 53/477; 53/479; 53/284.7; 53/374.2

(58) Field of Classification Search .................. 53/469, 53/477, 479, 284.7, 374.2
See application file for complete search history.

(56) References Cited

U.S. PATENT DOCUMENTS 2,568,794 A * 9/1951 Dieter ........................ 53/477
3,765,144 A * 10/1973 Schiesser .................... 53/477
4,204,378 A * 5/1980 Thompson .................. 53/477
4,243,448 A * 1/1981 Fagniart et al. .............. 53/477
5,054,267 A 10/1991 Dundas
5,606,844 A * 3/1997 Takagaki et al. ............. 53/410
2004/0263587 A1 12/2004 Tsuyuki et al.

FOREIGN PATENT DOCUMENTS

EP 0 409 388 A2 1/1991
JP 57-66923 4/1982
JP 2004-314554 11/2004
JP 2004-338146 12/2004

* cited by examiner

*Primary Examiner*—Stephen F Gerrity
(74) *Attorney, Agent, or Firm*—Oblon, Spivak, McClelland, Maier & Neustadt, P.C.

(57) ABSTRACT

A method of sealing a liquid container, including filling a liquid into a liquid containing bag including a cylindrical inlet; and sandwiching the cylindrical inlet with a pair of heat-sealing heads upon application of heat such that the cylindrical inlet is sealed with the liquid therein, wherein at least one of the pair of heat-sealing heads comprises a concave edge.

19 Claims, 15 Drawing Sheets

128 140 141 141a 142a 142 143 143 13 144 144 2 152 151 152a 152b 152c 54

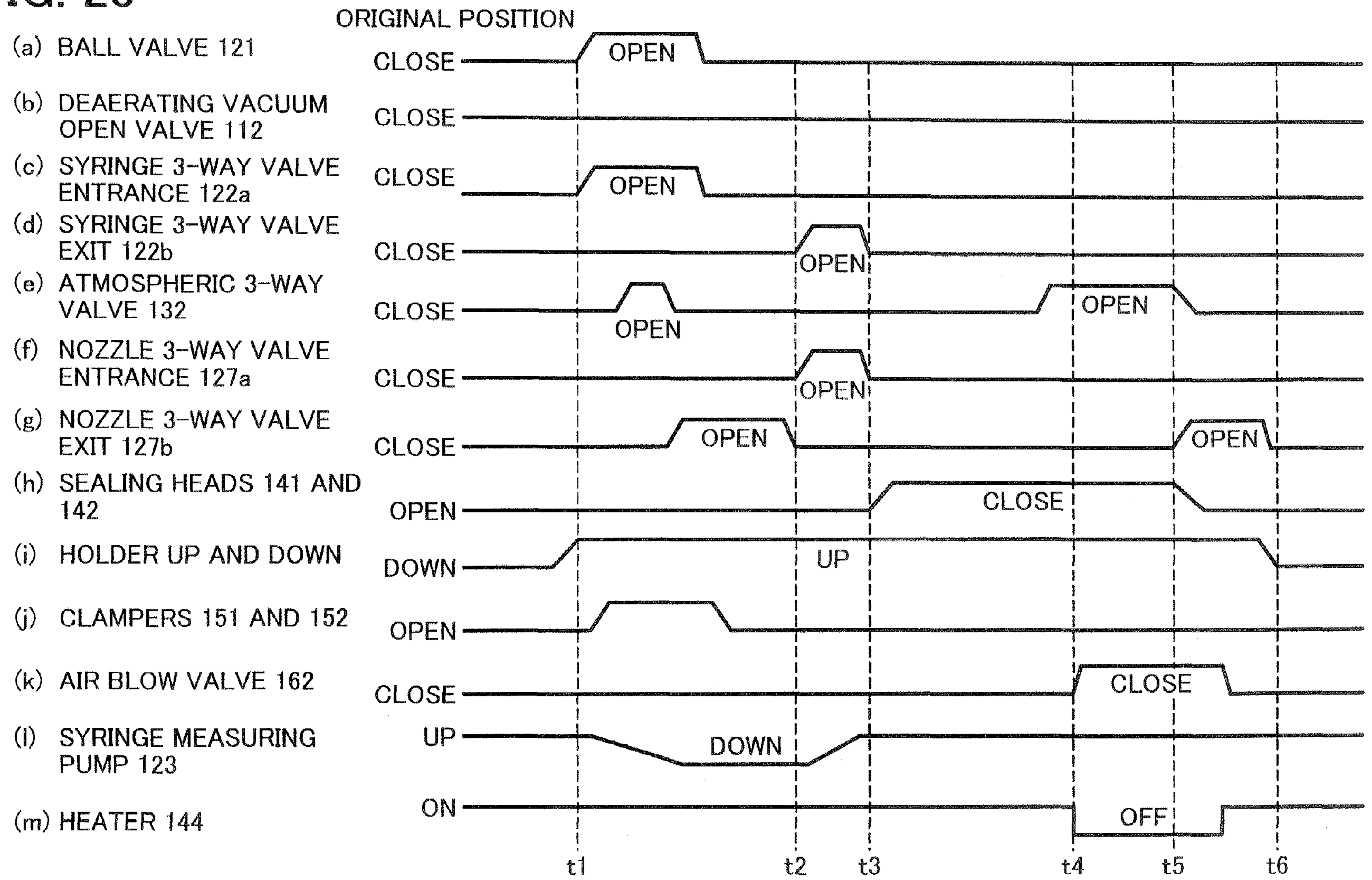
FIG. 23
ORIGINAL POSITION
(a) BALL VALVE 121
CLOSE
OPEN
(b) DEAERATING VACUUM OPEN VALVE 112
CLOSE
(c) SYRINGE 3-WAY VALVE ENTRANCE 122a
CLOSE
OPEN
(d) SYRINGE 3-WAY VALVE EXIT 122b
CLOSE
OPEN
(e) ATMOSPHERIC 3-WAY VALVE 132
CLOSE
OPEN
OPEN
(f) NOZZLE 3-WAY VALVE ENTRANCE 127a
CLOSE
OPEN
(g) NOZZLE 3-WAY VALVE EXIT 127b
CLOSE
OPEN
OPEN
(h) SEALING HEADS 141 AND 142
OPEN
CLOSE
(i) HOLDER UP AND DOWN
DOWN
UP
(j) CLAMPERS 151 AND 152
OPEN
(k) AIR BLOW VALVE 162
CLOSE
CLOSE
(l) SYRINGE MEASURING PUMP 123
UP
DOWN
(m) HEATER 144
ON
OFF
t1
t2
t3
t4
t5
t6

METHOD OF SEALING A CYLINDRICAL INLET OF A BAG

CROSS REFERENCE TO RELATED APPLICATIONS

This application claims priority and contains subject matter related to Japanese Patent Application No. 2005-319173 filed on Nov. 2, 2005, the entire contents of which are hereby incorporated by reference.

BACKGROUND OF THE INVENTION

1. Field of the Invention

The present invention relates to a heat sealing apparatus, a method of sealing a liquid containing bag, a liquid filler and a sealed liquid containing bag, and more particularly to a method of sealing a container containing ink for inkjet recording, an ink filler, a sealed container containing ink for inkjet recording.

2. Discussion of the Background

Japanese Laid-Open Patent Publications Nos. 2004-338146 and 2004-314554 disclose methods of sealing a liquid in a bag with a thermal head.

When sealing a bag, the heat-sealing heads sandwich a tube that is used to deaerate the inside of the bag. During this process, the tube should not be melted and the bag should completely be sealed. Therefore, as disclosed in Japanese Laid-Open Patent Publication No.2004-338146, a pair of thermal heads have a difference of temperature of from 10 to 40° C.

FIG. 1A is a schematic plan view illustrating a conventional heat-sealing head, and FIG. 1B is a schematic side view illustrating the same.

Since the end of the conventional heat-sealing head is flat and the filling orifice is round, the heat conduction is not properly performed (hereinafter referred to as defective heat sealing). Therefore, it takes a long time (5 to 9 sec.) to seal a bag such that ink does not leak.

Furthermore, the resin becomes sticky near the ink inlet when sealed The ink inlet is then cooled after being sealed to solve this problem.

Because of these reasons, a need exists for effectively sealing a liquid container in a short time without defective heat sealing and sticky resin, further improving the methods disclosed in Japanese Laid-Open Patent Publications Nos. 2004-338146 and 2004-314554.

SUMMARY OF THE INVENTION

Accordingly, an object of the present invention is to provide a method of effectively sealing a liquid container in a short time without defective heat-sealing and sticky resin. This object and other objects of the present invention, either individually or collectively, have been satisfied by the discovery of a method of sealing a liquid container, that includes filling a liquid into a liquid container bag that includes a cylindrical inlet; and sandwiching the cylindrical inlet with a pair of heat-sealing heads upon application of heat such that the cylindrical inlet is sealed with the liquid therein, wherein at least one of the pair of heat-sealing heads includes a concave edge.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 23 is a time-series chart for explaining the operation of the filler of the present invention.

DESCRIPTION OF THE PREFERRED EMBODIMENTS

The present invention provides a method of effectively sealing a liquid container in a short time without defective heat sealing and/or sticky resin.

Figure 6:
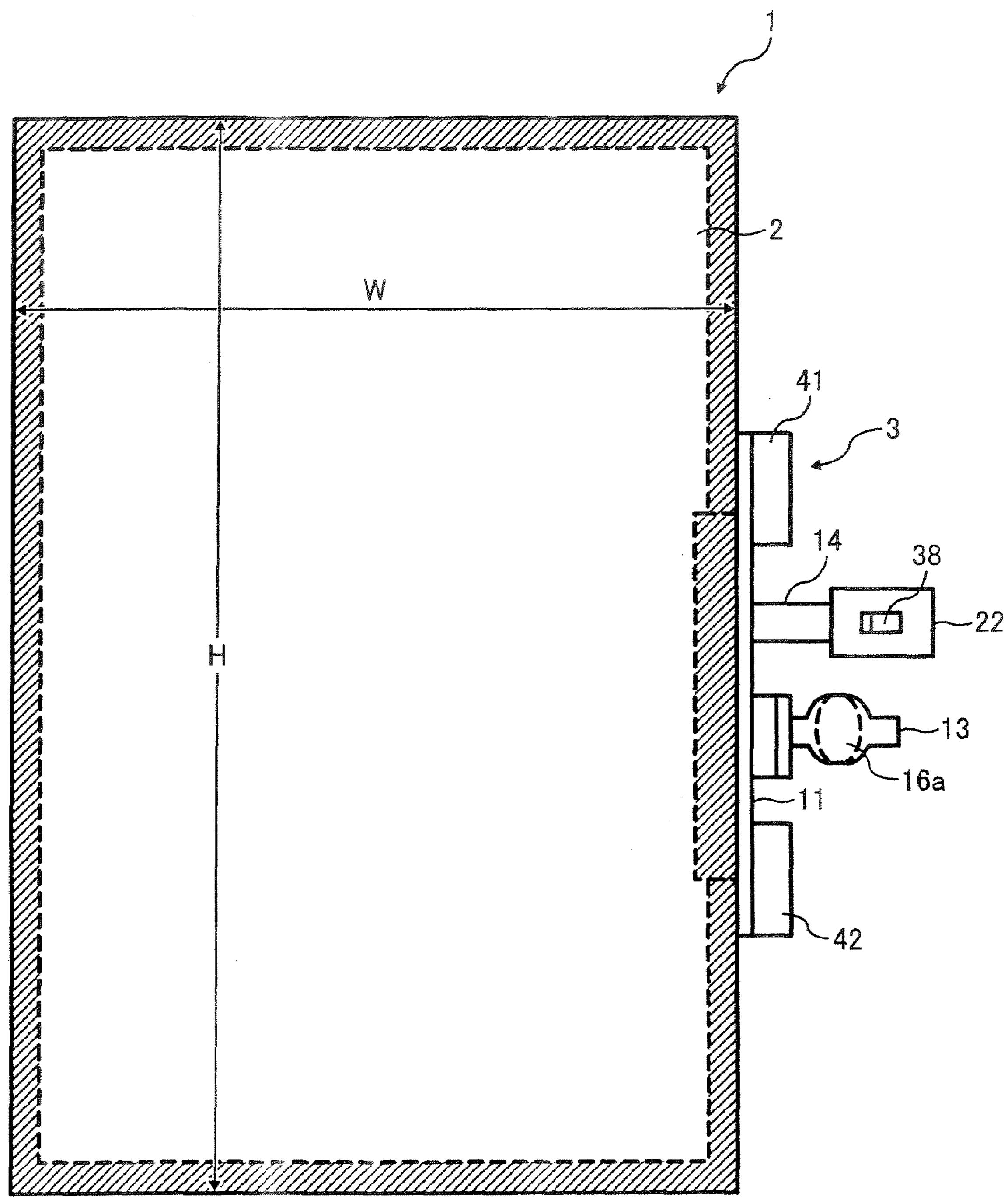
FIG. 6 is a schematic view illustrating an embodiment of an ink bag (one embodiment of a liquid container bag) wherein a liquid is filled by the filler of the present invention.
Figure 7:
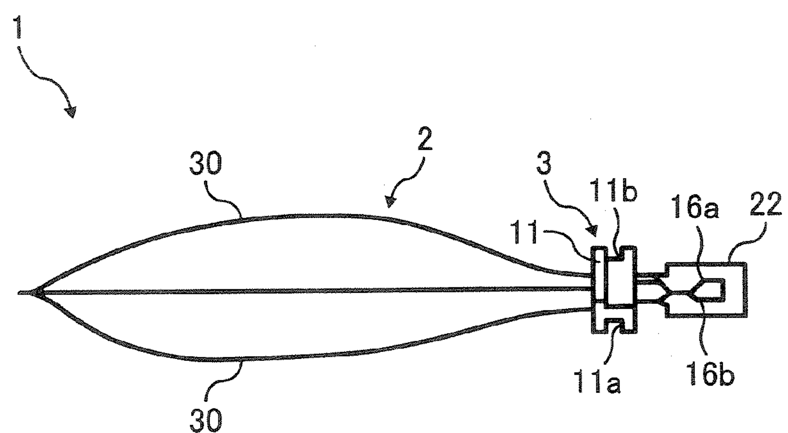
FIG. 7 is a schematic bottom view illustrating the ink bag in FIG. 6, filled with an ink.
Figure 8:
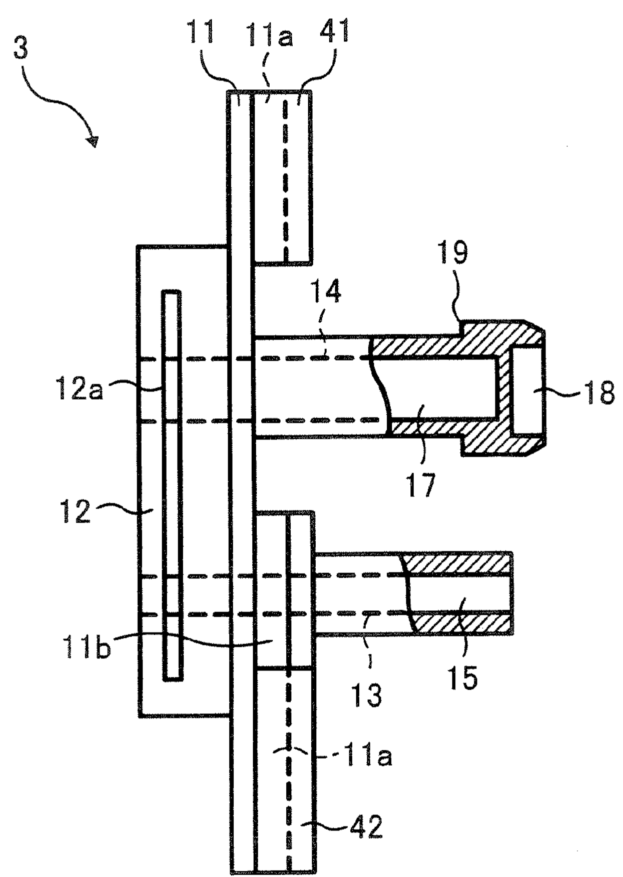
FIG. 8 is a schematic side view illustrating a holder of the ink bag in FIG. 6 before sealed.
Figure 9:
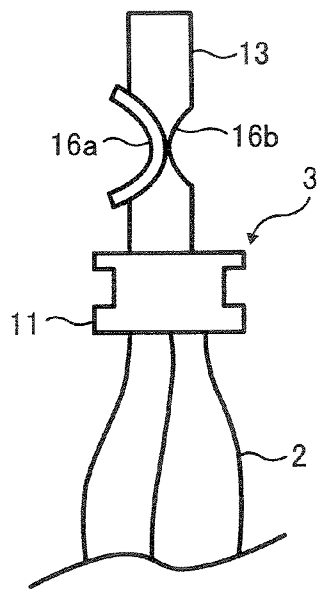
FIG. 9 is a schematic view illustrating an embodiment of the sealed ink bag of the present invention.
Figure 10:
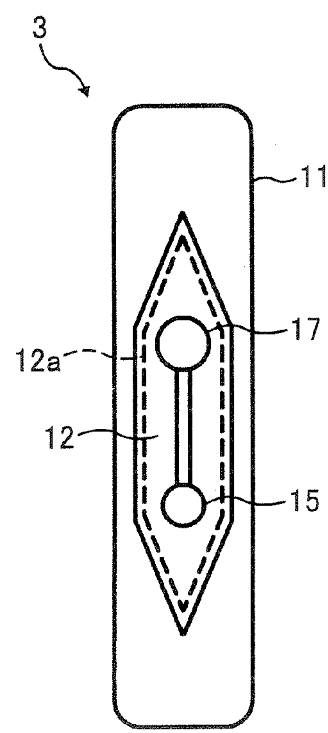
FIG. 10 is a schematic view illustrating a backside of a holder in FIG. 9.
Figure 11:
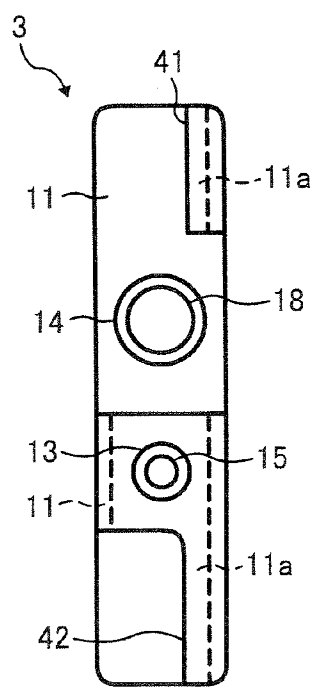
FIG. 11 is a schematic view illustrating a foreside of a holder in FIG. 9.
Figure 12:
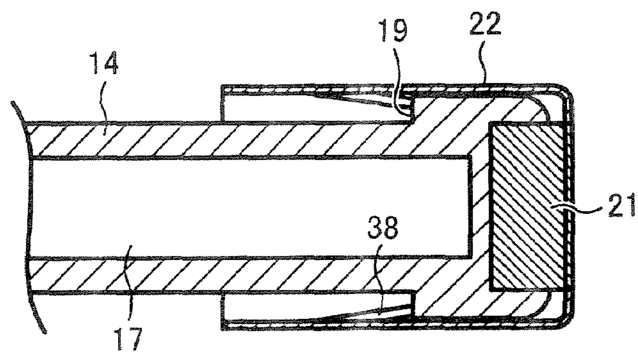
FIG. 12 is a schematic view illustrating a cross-section of an ink outlet of the ink bag.
Figure 13:
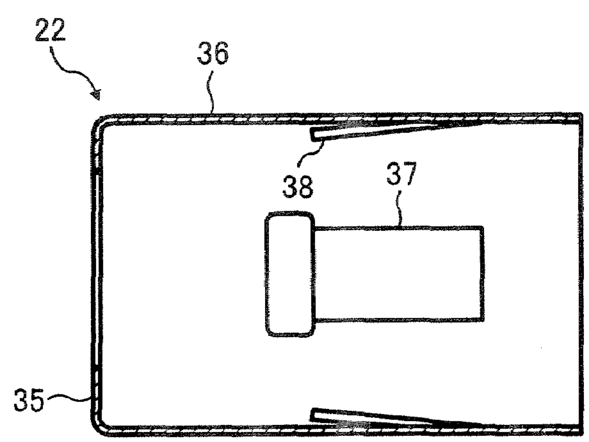
FIG. 13 is a schematic view illustrating a cross-section of a cap of the ink outlet.
Figure 14:
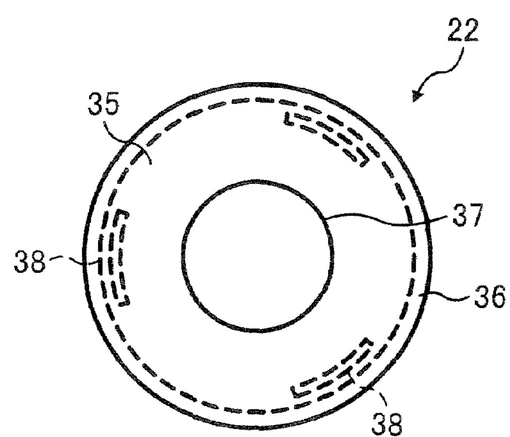
FIG. 14 is a schematic view illustrating a foreside of the cap.

First, an embodiment of the liquid container bag for use in the present invention is explained when used as, but not limited to, an ink bag, referring to FIGS. 6 to 14. FIG. 6 is a schematic view illustrating an embodiment of an ink bag (one embodiment of a liquid container bag) wherein a liquid is filled by the filler of one embodiment of the present invention; FIG. 7 is a schematic bottom view illustrating the ink bag in FIG. 6 filled with an ink; FIG. 8 is a schematic side view illustrating a holder of the ink bag in FIG. 6 before sealed; FIG. 9 is a schematic view illustrating an embodiment of the sealed ink bag of the present invention; FIG. 10 is a schematic view illustrating a backside of a holder in FIG. 9; FIG. 11 is a schematic view illustrating a foreside of a holder in FIG. 9; FIG. 12 is a schematic view illustrating a cross-section of an ink outlet of the ink bag; FIG. 13 is a schematic view illustrating a cross-section of a cap of the ink outlet; and FIG. 14 is a schematic view illustrating a foreside of the cap.

As shown in FIGS. 6 and 7, a liquid container bag (an ink bag in the present embodiment) (1) may be, but is not limited to, almost a quadrangular and flexible bag (2) formed of an aluminum-laminated film, having a resin holder (3) fixed on one side thereof.

For example, as shown in FIGS. 6 and 7, circumferences of 2 pieces of aluminum-laminated film (30) formed of a dry lamination, an aluminum film, a dry lamination and PA in this order on LDPE, are sealed so as to adhere to a holder (3) and to form the bag (2). The bag (2) has no frame inside to maintain the shape and flexibility as a whole, and almost all liquid (ink) is squeezable. In addition, materials forming the bag (2) are not limited to the aluminum-laminated film (30).

The ratio (H/W) of the height (H) to the width (W) of the bag (2) is preferably from 1/1 to 1.5/1 (or 1/1.5) because this ratio provides a proper gravitational pressure and less residual ink when the liquid (ink) is horizontally discharged (provided). Depending on the thickness of the ink cartridge chassis, the bag (2) preferably has a ratio of the height (H) to the width (W) of from 1/1 to 1.5/1.

The holder (3) includes, as shown in FIGS. 6 to 12, a connector (12) on one side of a flange (11) in a body, on which the bag (2) is thermally sealed, and a hollow liquid (ink) inlet (13) (before sealed in FIG. 8) and a hollow liquid (ink) outlet (14) on the other side of the flange (11) in a body.

The connector (12) has tapered ends to have the shape of almost a rhombus (longitudinal ends of the holder (3) as FIG. 10 shows) and includes a concave portion (12*a*) on the outer circumferential surface. Therefore, the aluminum-laminated film (30) can be sealed on the outer circumferential surface of the connector (12) with no space in between the film (30) and the connector (12).

A hole (15) penetrating through the flange (11) and the connector (12) is formed inside the ink inlet (13), and after an ink is filled in the bag (2), a part of the ink inlet (13) is thermally melted to seal the bag (2). As shown in FIG. 9, both sides of the ink inlet (13) are melted at different temperatures respectively, and the melted parts (16*a*) and (16*b*) have asymmetrical shapes with respect to each other.

The present inventors discovered that the bag was not completely sealed when the melted parts (16*a*) and (16*b*) had symmetrical shapes with respect to each other. As a result of their further studies of this point, they discovered that they could completely seal the bag in a short time, improve the yield ratio and largely reduce sticky resin not only by sealing the bag such that the melted parts (16*a*) and (16*b*) have asymmetrical shapes with respect to each other, but also by including at least a partial concave edge on at least one of the pair of heat-sealing heads.

A hole (17) penetrating through the flange (11) and the connector (12) is formed inside the ink outlet (14). An opening (18), configured to receive an elastic member that is configured to seal the hole (17) once inserted therein, is formed at the end of the hole (17). Further, a bump (19), configured to retain a cap holding the elastic member, is formed on the outer circumferential surface of the hole (17).

As shown in FIG. 12, an elastic member (21) is inserted into the end of the ink outlet (14), and a cap (22) holds the elastic member (21). The elastic member (21) is preferably formed of rubber materials such as silicone, fluorine and butyl. When a hollow acicular needle from an ink recorder (a needle providing an ink to the recorder) pierces the elastic member (21), the elastic member (21) is capable of providing an ink thereto while sealing the bag and is capable of being restored to keep sealing the bag even when the needle is drawn out.

The shape of the elastic member (21) is not particularly limited, and may have any shapes capable of sealing the bag as discussed above, such as a circular cylinder, a triangular cylinder, a quadrangular cylinder, a pentagonal cylinder, a hexagonal cylinder, a heptangular cylinder or an octagonal cylinder.

As shown in FIGS. 13 and 14, the cap (22) is formed of a tubular member (36) having a flange (35) configured to press the rim of the elastic member (21). The flange (35) includes a hole (37) that the needle from the ink recorder is inserted into; and the tubular member (36) includes plural lock chips (38) bent inside. In addition, the shapes of the hole (37) is not particularly limited to a circle and may have any shape such as a triangle, a quadrangle, a pentangle, a hexagon, a heptagon or an octagon.

As shown in FIG. 12, when the end of the ink outlet (14) is capped with the cap (22), the lock chips (38) are engaged with the bump (19) of the ink outlet (14) such that the cap (22) is not removed from the ink outlet (14).

The ink outlet (14) is, as shown in FIG. 6, located in the middle of the holder (3). Therefore, an ink in the ink bag (2) flows more smoothly than when the ink outlet (14) is eccentrically-located on one side of the holder, and the ink can almost completely be consumed.

Further, the holder (3) includes engaging members (41) and (42) configured to engage with engaging clicks (discussed below) formed on the chassis of the ink cartridge. As shown in FIGS. 7 and 8, the flange (11) includes grooves (11*a*) and (11*b*) on the side collaterally to the engaging members (41) and (42). As shown in FIG. 6, the ink bag (1) includes an almost quadrangular and flexible bag (2). The holder (3) is fixed on one side of the ink bag and includes the ink inlet (13) for filling an ink in the bag and the ink outlet (14) for discharging the ink. The ink inlet (13) is partially melted and sealed upon application of heat. At least one of the pair of heat-sealing heads, which includes at least a partial concave edge to form asymmetrical sealed parts with respect to each other (as explained in detail later with FIG. 2), completely seals the bag in a short time, thus improving the yield ratio and largely reducing sticky resin.

Figure 15:
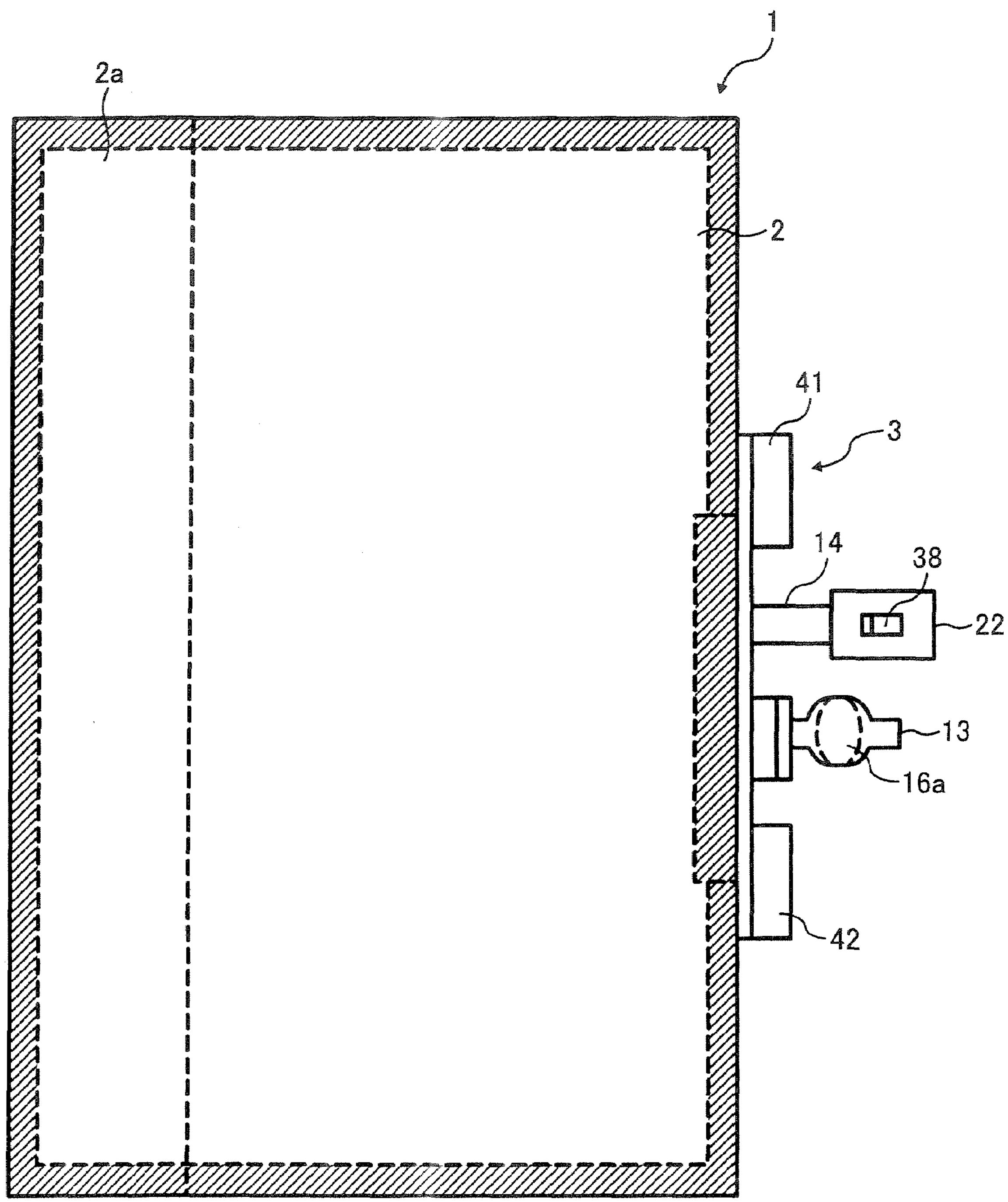
FIG. 15 is a schematic view illustrating another embodiment of the ink bag of the present invention.
Figure 16:
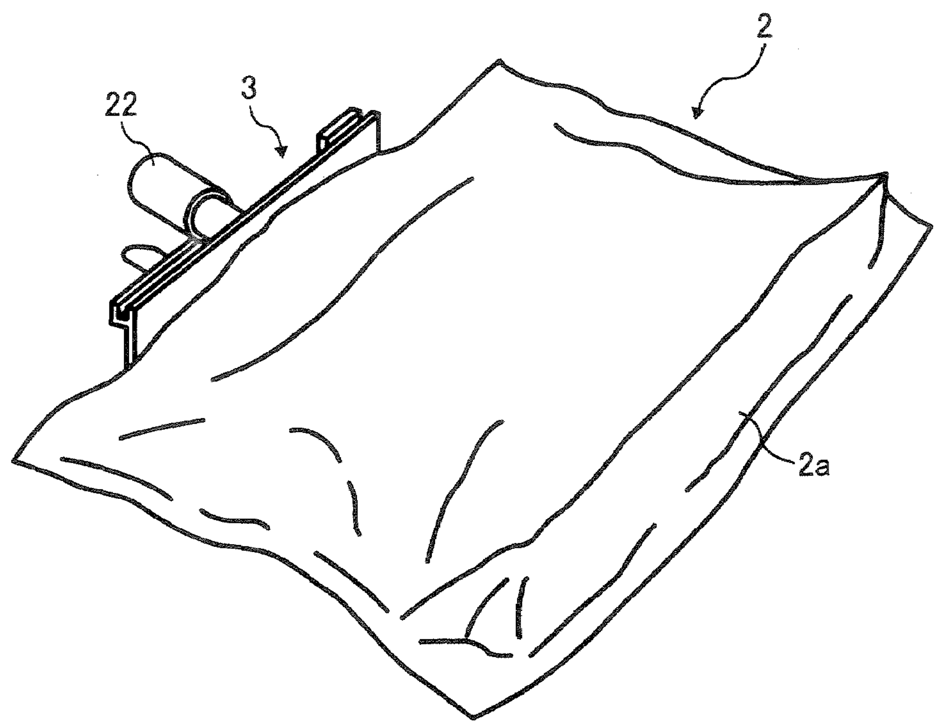
FIG. 16 is a perspective view of the ink bag in FIG. 15, filled with an ink.
Figure 17:
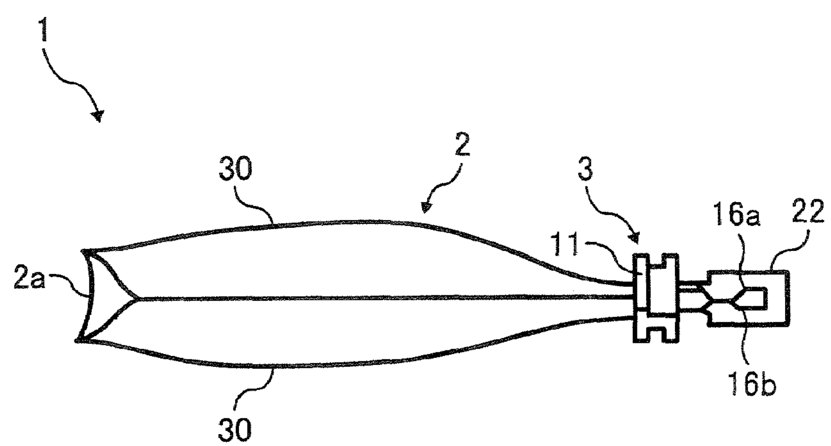
FIG. 17 is a schematic bottom view illustrating the ink bag in FIG. 16.

Another embodiment of the ink bag of the present invention is explained by referring to FIGS. 15 to 17. FIG. 15 is a schematic view illustrating another embodiment of the ink bag of the present invention; FIG. 16 is a perspective view of the ink bag in FIG. 15, filled with an ink; and FIG. 17 is a schematic bottom view illustrating the ink bag in FIG. 16.

In this embodiment of the ink bag (1), a bag (2) is formed of three aluminum-laminated films (30); one of which forms a backside (bottom) of the bag (2*a*). Therefore, the ink bag (1) has a larger capacity. Elements 3, 11, 13, 14, 16*a*, 16*b*, 22, 38, 41 and 42 depicted in FIGS. 15-17 designate like corresponding parts as previously described.

Figure 18:
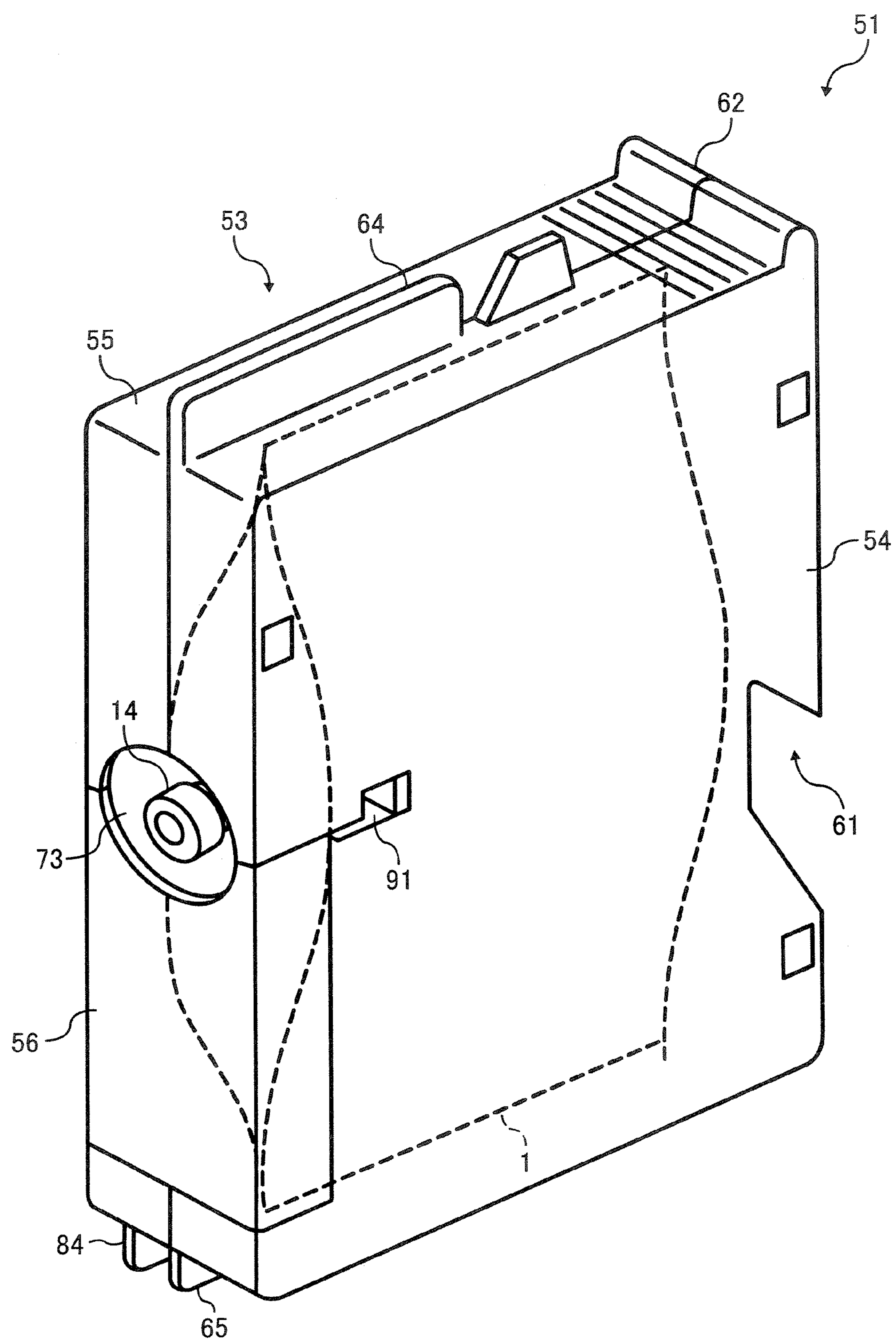
FIG. 18 is a perspective view of an embodiment of an ink (liquid) cartridge in the present invention.
Figure 19:
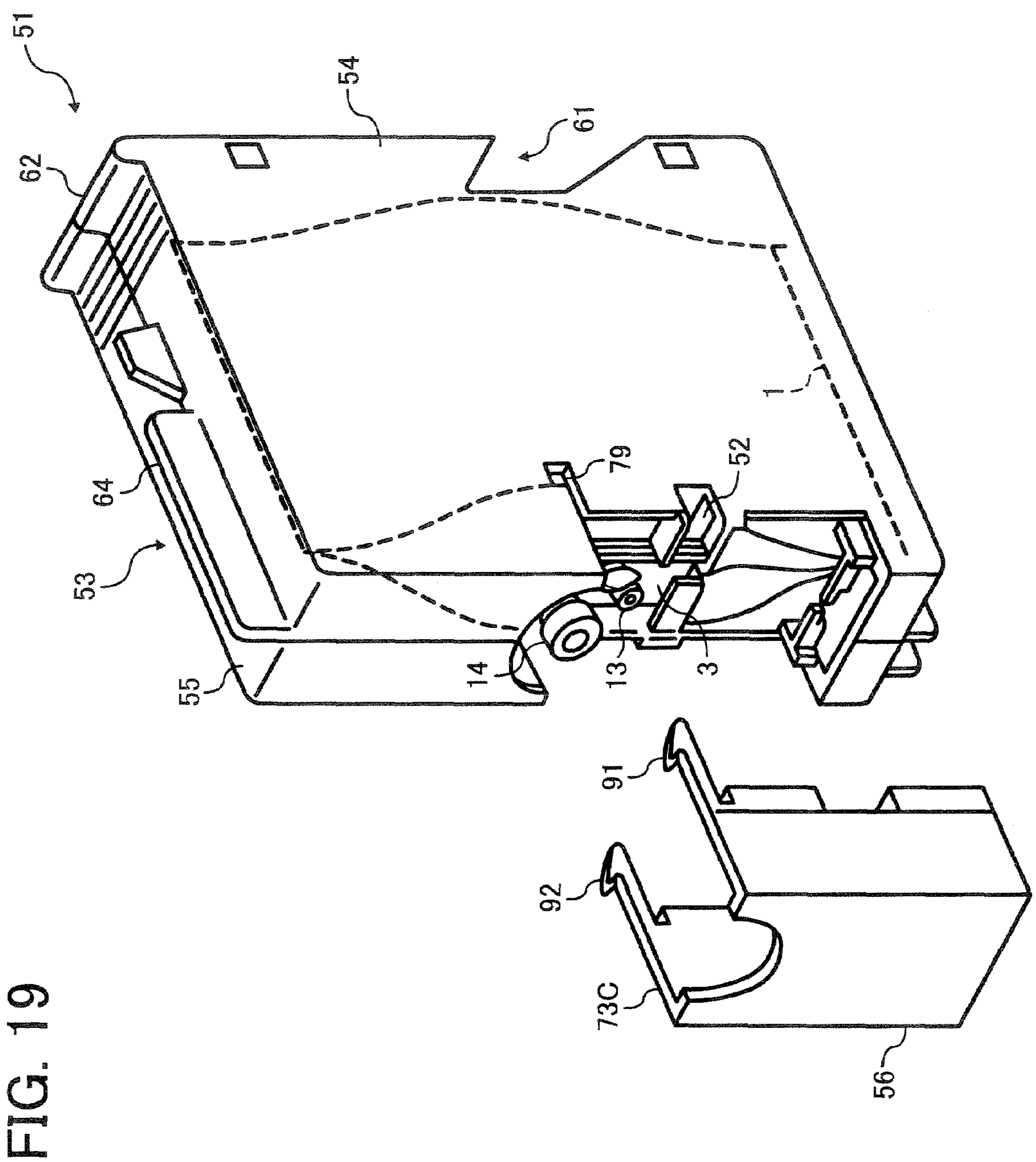
FIG. 19 is a perspective view of the embodiment of the ink cartridge in FIG. 18, from which a third chassis is removed.
Figure 20:
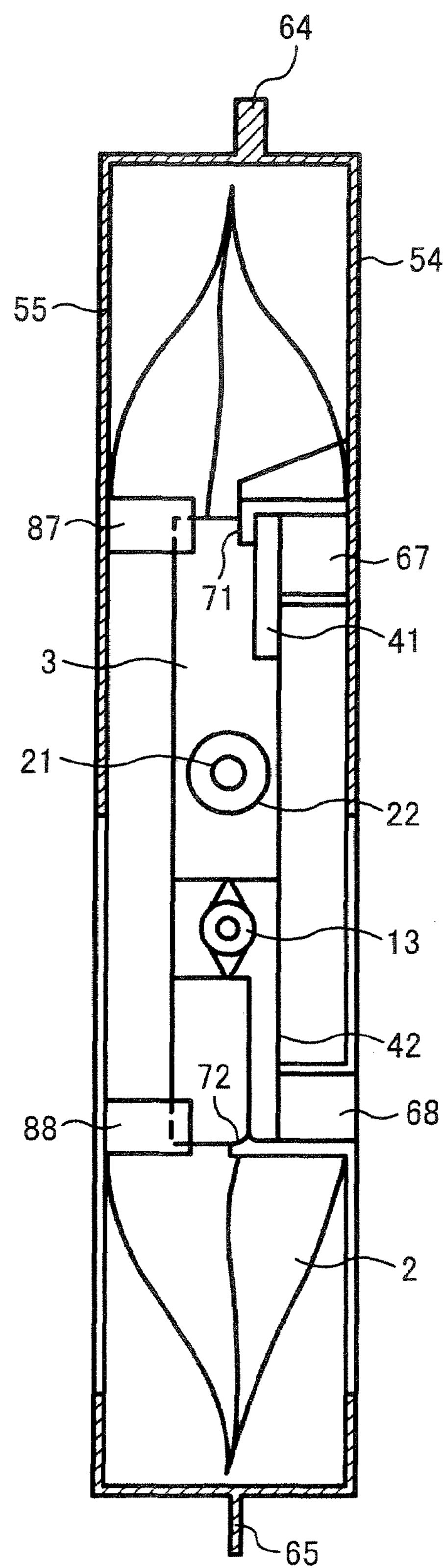
FIG. 20 is a schematic view illustrating a foreside cross-section of the embodiment of the ink cartridge.

An ink cartridge containing the ink bag is explained, referring to FIGS. 18 to 20. FIG. 18 is a perspective view of an embodiment of an ink (liquid) cartridge in the present invention; FIG. 19 is a perspective view of the embodiment of the ink cartridge in FIG. 18, from which a third chassis is removed; and FIG. 20 is a schematic view illustrating a foreside cross-section of the embodiment of the ink cartridge.

An ink cartridge (51) includes an ink bag (1) and a chassis (53) containing the ink bag (1). The chassis (53) includes a first chassis (54), a second chassis (55) and a third chassis (56). The first chassis (54) and the second chassis (55) form a chassis configured to protect the sides of the ink bag (1). The chassis (53) is divided into the first chassis (54) and the second chassis (55) parallel to the ink providing (discharging) direction.

The chassis (53) of the ink cartridge (51) is almost cuboid, combining the similar shapes of first chassis (54) and the second chassis (55), and further fitting in the third chassis (56). A concave part (61) and a hook (62) are formed on the backside of the ink cartridge (51) for fingers, etc. to easily insert or pull the ink cartridge (51) into or out of an ink recorder. An opening (73) is formed on the foreside of the ink cartridge (51), through which the ink outlet (14) appears.

The internal surface of the first chassis (54) includes positioners (67) and (68) configured to position the holder (3) for engaging and holding the holder (3) of the ink bag (1), and engaging clicks (71) and (72) configured to engage the engaging members (41) and (42) of the holder (3). The positioners (67) and (68), and the engaging clicks (71) and (72) form engaging and holding means.

Further, the first chassis (54) includes an engaging concave part (79) configured to engaged with an engaging click of the third chassis (56) when fitted therein, and the foreside thereof includes a portion that forms arc, which forms ¼ of the opening (73). The second chassis (55) has an identifier (84) formed of a projecting chip showing the color of an ink filled in the ink bag (1) of the ink cartridge (51). Further, the internal surface of the second chassis (55) has races (87) and (88), configured such that the holder (3) of the ink bag (1) can be fitted therein.

The third chassis (56) is fitted in notches on the ink providing (front) sides of the combined first chassis (54) and second chassis (55) as shown in FIG. 19. The third chassis (56) includes engaging clicks (91) and (92) to be engaged with the engaging concave part (79) of the first chassis (54) and an engaging concave part (not depicted) of the second chassis (55) respectively, and forms an arc (73C) which forms ½ of the opening (73).

As shown in FIG. 19, when the third chassis (56) is fitted in the first chassis (54) and the second chassis (55) while the engaging clicks (91) and (92) are engaged with the engaging concave part (79) of the first chassis (54) and the engaging concave part (not depicted) of the second chassis (55), the ink cartridge (51) as shown in FIG. 18 is completed. Elements 2, 13, 14, 21, 22, 41 and 42 depicted in FIGS. 18-20 designate like corresponding parts as previously described.

Figure 21:
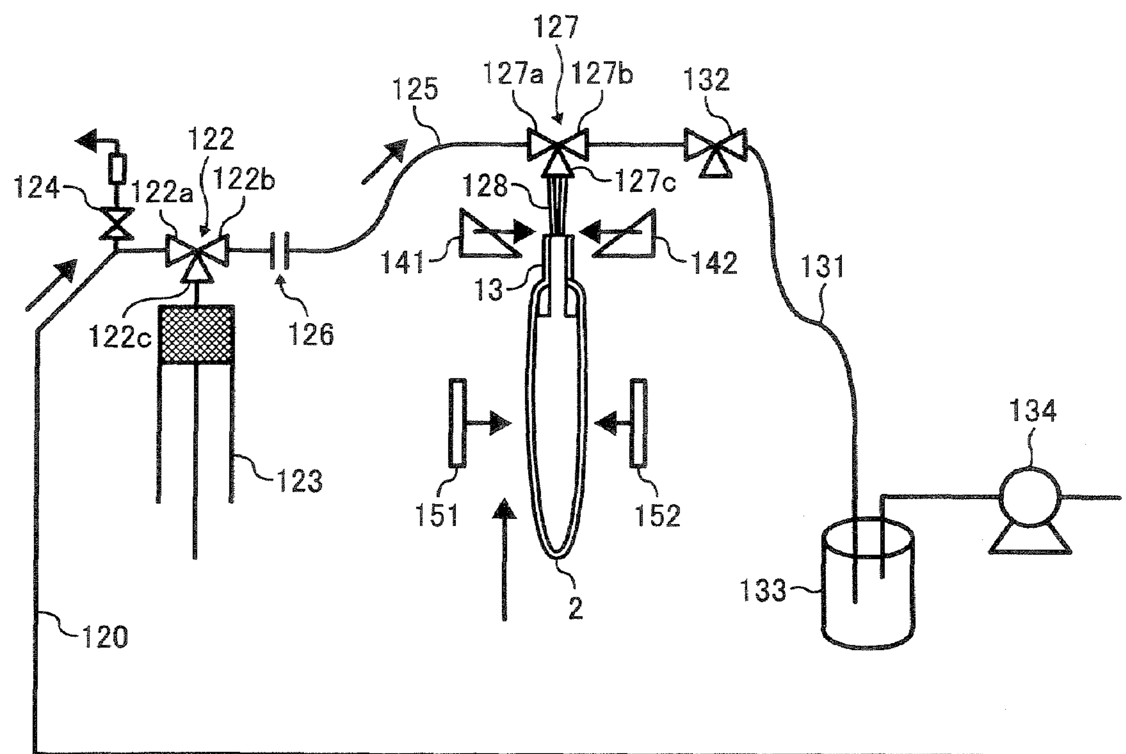
FIG. 21 is an entire configuration of the filler of the present invention.
Figure 21:
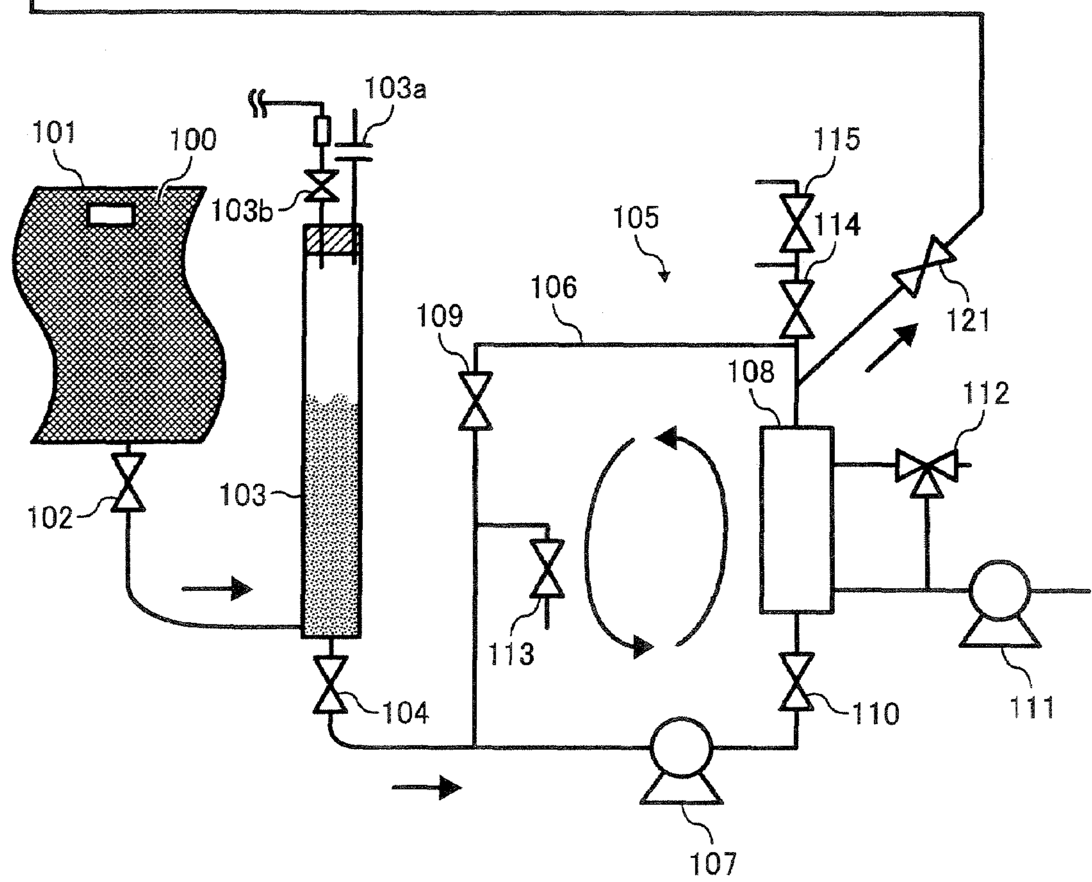
Figure 22:
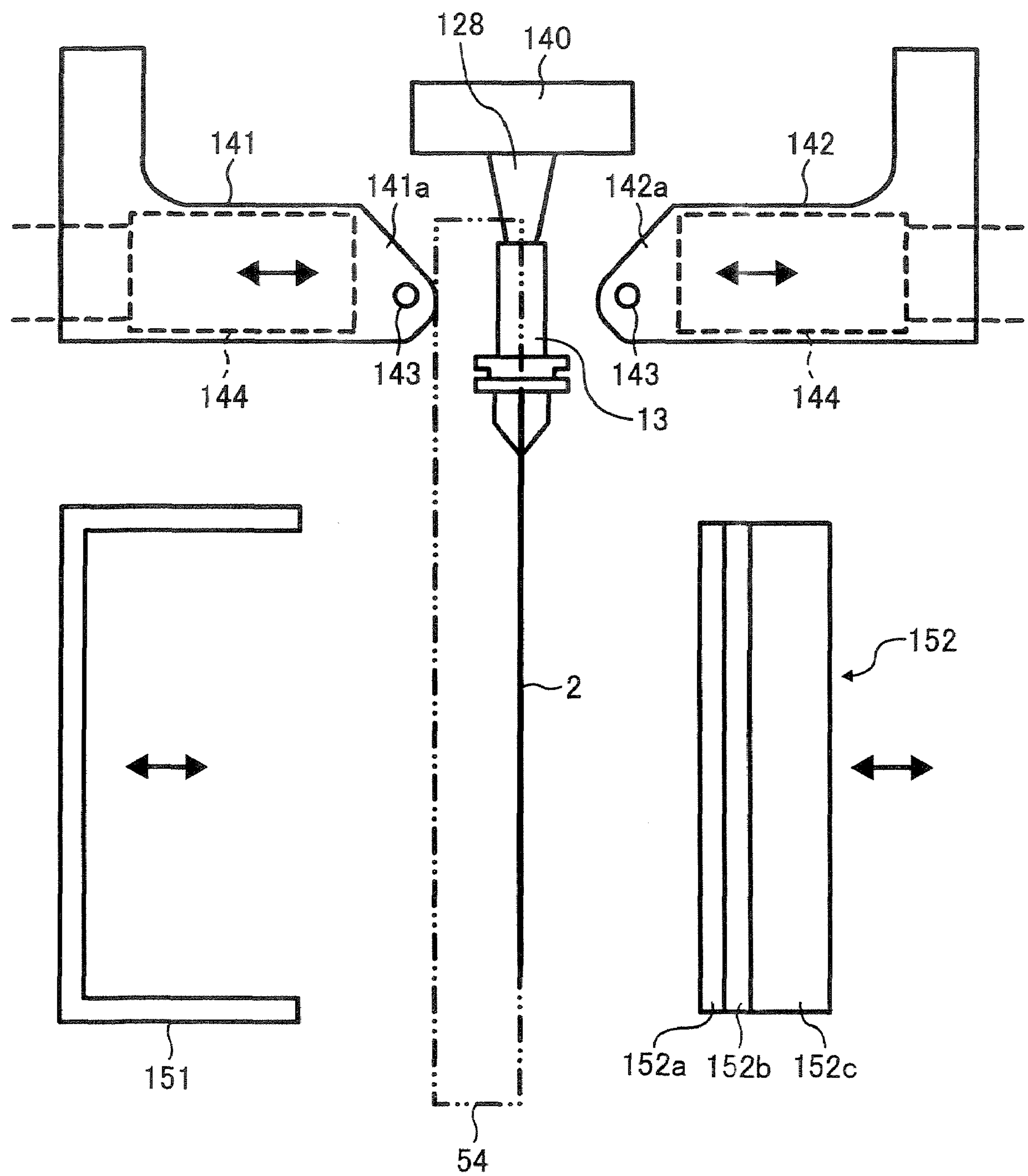
FIG. 22 is a schematic view illustrating a sealing member of the filler of the present invention.

The sealing method, the liquid filling method and the liquid filler of the present invention are explained when the liquid is an ink, referring to FIGS. 21 and 22. FIG. 21 is one embodiment of an entire configuration of the filler of the present invention.

A deaerated ink (100) stored in a stock container (101) is fed to a cushion tank (103) through a coupler (102), and further fed to a deaerator (105) through a coupler (104) from the cushion tank (103). The inside of the cushion tank (103) is connected to atmospheric air through an air filter (103*a*) and a valve (103*b*) is connected to the inside thereof.

The deaerator (105) includes a circulating pump (107), a deaerating module (108), and valves (109) and (110) in its circulating route (106). A deaerating vacuum pump (111) and a deaerating vacuum open valve (112) are connected to the deaerating module (108). While the ink (100) is circulated in the circulating route (106) by the circulating pump (107), the deaerating vacuum pump (111) is activated such that the deaerating module (108) deaerates the ink (100). A valve (113), and a series circuit of valves (114) and (115) are also connected to the circulating route (106) of the deaerator (105).

The circulating route (106) of the deaerator (105) is connected to an entrance valve (122*a*) of a syringe three-way valve (122) by a route (120) through a ball valve (121). A syringe measuring pump (123) is connected to a common valve (122*c*) of the syringe three-way valve (122). A valve (124) is connected to the route (120).

Further, an exit valve (122*b*) of the syringe three-way valve (122) is connected to a route (125) and to a feeding valve (127*a*) of a nozzle three-way valve (127). A filling nozzle (128) for filling the ink (100) in an ink bag (2) is connected to a common valve (127*c*) of the nozzle three-way valve (127). A vacuum valve (127*b*) of the nozzle three-way valve (127) is connected to a route (131) and a trapper (133) through an atmospheric three-way valve (132). A work vacuum pump (134) is connected to the trapper (133).

FIG. 22 is a schematic view illustrating a sealing member of the filler of the present invention. In FIG. 22, the filling nozzle (128) is held by a nozzle holder (140). Below the filling nozzle (128), heat-sealing heads (141) and (142), configured to heat-seal the ink inlet (13) of the ink bag (2) from opposite two sides, are movably located in the direction of an arrow.

A pair of the heat-sealing heads (141) and (142) are tapered toward edges of the heads (141*a*) and (142*a*) to almost have the shape of a triangle. The heat-sealing heads (141) and (142) have holes (143) including temperature sensors, and includes heaters (144) to heat the heads.

Further, below the heat-sealing heads (141) and (142), dampers (151) and (152) configured to discharge air from the ink bag (2) are movably located in the direction of an arrow. In this embodiment, an ink is filled in the ink bag (2) held on the first chassis (54) of the ink cartridge (51). The first chassis (54) is pressed by the damper (151) and the ink bag (2) is pressed by the damper (152) including layered elastic members (152*a*) and (152*b*) and a stiff member (152*c*). This embodiment does not include a particular cooler cooling the ink inlet (13) of the ink bag (2).

An embodiment of the operation of the filler is explained, referring to FIG. 23 and as depicted in FIGS. 21 and 22.

First, at a point (t1), (a) the ball valve (121) is opened and (c) the entrance (122*a*) of the syringe three-way valve (122) is opened. (l) The piston of the syringe measuring pump (123) is gradually lowered to draw an ink therein.

On the other hand, (i) a work holder (not shown) is elevated to elevate a work, i.e., the ink bag (2) held on the first chassis (54) such that the filling nozzle (128) is set in the ink inlet (13). (j) The clampers (151) and (152) press the ink bag (2) through the first chassis (54) to discharge air therefrom, and return to the original positions.

Then, (e) the atmospheric three-way valve (132) is opened, and when the atmospheric three-way valve (132) is closed, (g) the vacuum valve (127*b*) of the nozzle three-way valve (127) is opened.

At a point (t2), (g) the vacuum valve (127*b*) of the nozzle three-way valve (127) is closed, (d) the exit valve (122*b*) of the syringe three-way valve (122) is opened, (f) the feeding valve (127*a*) of the nozzle three-way valve (127) is opened, and the piston of the syringe measuring pump (123) is elevated to discharge the ink from the filling nozzle (128) to fill the ink bag (2) with the ink through the ink inlet (13).

During this time, (m) the heaters (144) of the heat-sealing heads (141) and (142) are preferably turned on to preliminarily heat the ink inlet (13) of the ink bag (2).

At a point (t3), (h) the heat-sealing heads (141) and (142) press the opposite two sides of the ink inlet (13) to heat-seal the ink inlet (13), then (e) the atmospheric three-way valve (132) is opened.

At a point (t4), (m) the heater are turned off and (k) an air blow valve (not depicted) is opened to blow air on the ink inlet (13) to be cooled. At a point (t5), the heat-sealing heads (141) and (142) are returned to the original positions, (e) the atmospheric three-way valve (132) is closed, the vacuum valve (127*b*) of the nozzle three-way valve (127) is opened, (m) the heaters are turned on, the air blow valve is closed, the vacuum valve (127*b*) of the nozzle three-way valve (127) is closed and the holder is lowered. From a point (t1) to a point (t6), (b) a deaerating vacuum open valve (112) remains in original position.

Thus, the ink inlet (13) is easily heat-sealed without fail.

Next, the heat-sealing conditions with the heat-sealing heads (141) and (142), the shapes of the edges and materials thereof are explained, referring to FIGS. 1 to 5.

Figure 1A:
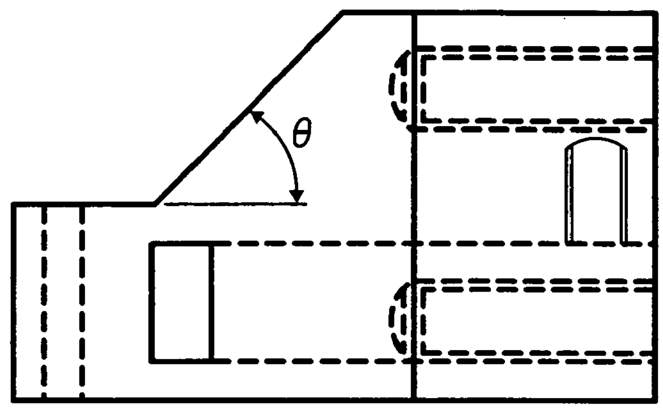
FIGS. 1A and 1B are schematic plan and side views illustrating a conventional heat-sealing head.
Figure 1B:
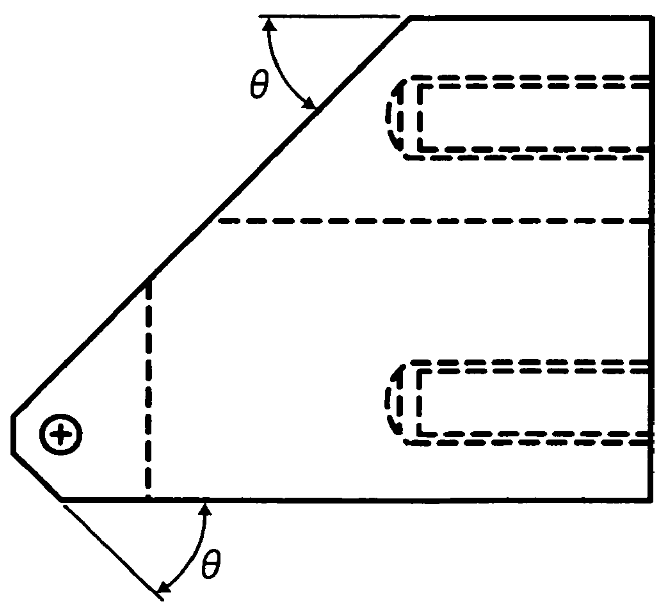
Figure 2A:
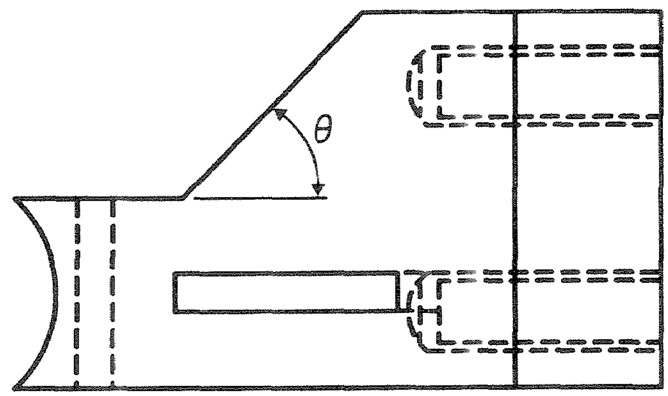
FIGS. 2A and 2B are schematic plan and side views illustrating an embodiment of the heat-sealing head of the present invention.
Figure 2B:
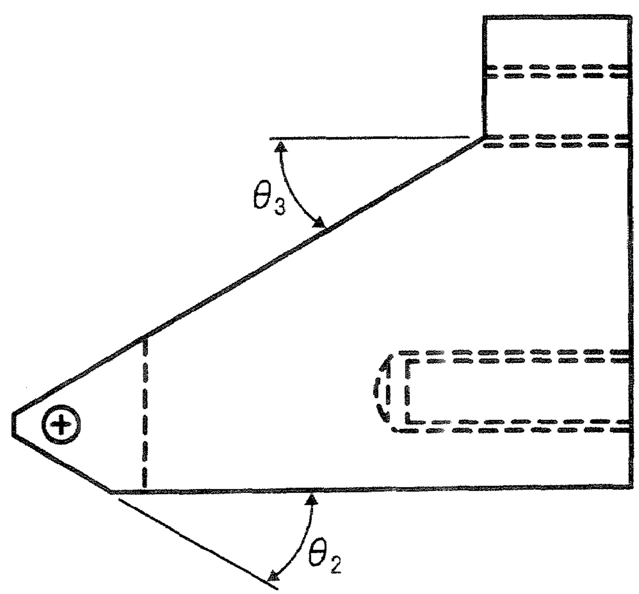

FIGS. 1A and 1B are schematic plan and side views illustrating a conventional heat-sealing head; and FIGS. 2A and 2B are schematic plan and side views illustrating one embodiment of the heat-sealing head of the present invention.

Comparing FIG. 1B with FIG. 2B, angles at edges ($\theta$, $\theta_2$ and $\theta_3$) are different. The edge is concave or convex.

The concavity of the heat-sealing head depends on the material and the shape of a thing to be sealed.

When only one of the heat-sealing heads has a sharp edge angle, the heat-sealing head can enter the ink inlet (13) quickly, and can heat-seal the bag in a short time.

Figure 3:
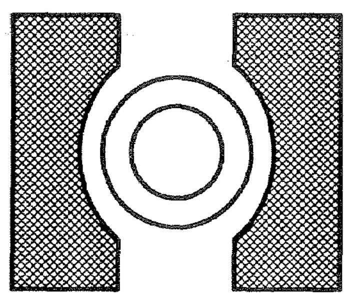
FIG. 3 is a schematic view illustrating an embodiment of the shape of the heat-sealing head of the present invention.

One of the heat-sealing heads of the present invention may comprise a concave edge and the other may have a flat edge. In addition, both of them may have convex edges as shown in FIG. 3.

Figure 4:
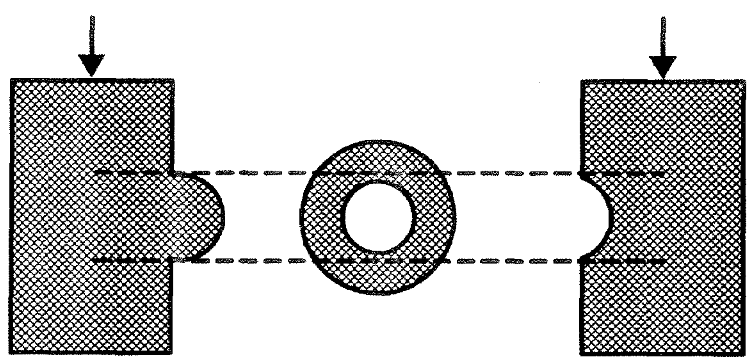
FIG. 4 is a schematic view illustrating another embodiment of the shape of the heat-sealing head of the present invention.

Further, as shown in FIG. 4, one of the heat-sealing heads of the present invention may include a concave edge and the other may have a convex edge.

In this case, one side of the ink inlet is largely convexed or only one side thereof is convexed.

Figure 5:
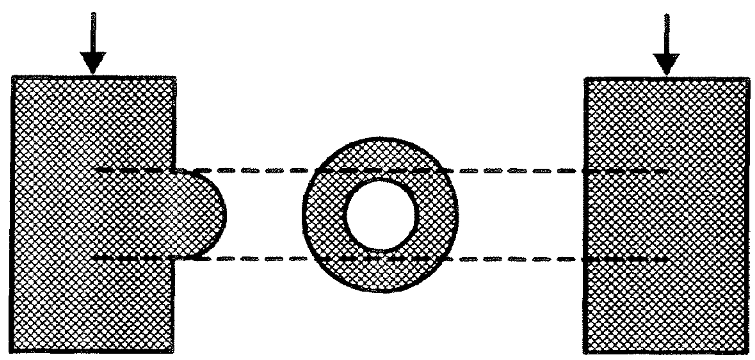
FIG. 5 is a schematic view illustrating a further embodiment of the shape of the heat-sealing head of the present invention.

Further, as shown in FIG. 5, one of the heat-sealing heads of the present invention may include a convex edge and the other may have a flat edge. In this case, one side of the ink inlet is largely concaved or only one side thereof is concaved.

When only one of the heads has a convex, i.e., tubulous or cylindrical shape (typically having a circular cross section, but not particularly limited to a perfect circular cross section, and which may have an oval cross section, or a polygonal cross section such as a hexagon and an octagon) smaller than a total diameter of the ink inlet, only the required place is heated, resulting in a short sealing time and less leaking ink.

In this case, one side of the ink inlet is largely concaved or only one side thereof is concaved.

The heat-sealing heads (141) and (142) preferably have a difference of from 10 to 240° C., more preferably from 50 to 200° C., and furthermore preferably from 120 to 160° C. in temperature.

Each of the edges (141*a*) and (142*a*) of the heat-sealing heads (141) and (142) has a composite surface coating including a fluorine-containing resin such as a composite coating including a fluorine-containing resin and nickel. Configuring the heat-sealing heads (141) and (142) to include a composite surface coating that includes a water-repellent resin prevents the melted inlet from affixing thereto.

The ink inlet is preferably not cooled after being sealed. Conventionally, the ink inlet has not been sealed without cooling the heads, but sealing workability can be improved without cooling.

The ink inlet preferably has a softening point of from 100 to 130° C., and more preferably from 110 to 120° C. to smoothly be sealed.

Thus, one side of the ink inlet is largely concaved or only one side thereof is concaved.

Having generally described this invention, further understanding can be obtained by reference to certain specific examples which are provided herein for the purpose of illustration only and are not intended to be limiting.

EXAMPLES

The heat-sealing heads (141) and (142) in FIG. 22 are head A and head B respectively.

Examples 1 to 5 and Comparative Examples 1 to 2

The heat-sealing heads in Examples 1 to 5 and Comparative Examples 1 to 2 are shown in Table 1.

TABLE 1

| | Head A | | Head B | | Heating | | | |
|---|---|---|---|---|---|---|---|---|
| | Shape | Temp. (° C.) | Shape | Temp. (° C.) | time (sec) | Sealing evaluation | Sticky resin | Defective sealing |
| Ex. 1 | Sharp-edged concave | 170 | Sharp-edged concave | 140 | 4.4 | 3 | 3 | 4 |
| Ex. 2 | Sharp-edged concave | 230 | Sharp-edged concave | 185 | 3.2 | 3 | 3 | 4 |
| Ex. 3 | Sharp-edged concave | 230 | Flat | 185 | 1.9 | 3 | 4 | 4 |
| Ex. 4 | Sharp-edged flat | 230 | Flat | 185 | 1.5 | 3 | 3 | 3 |
| Ex. 5 | Sharp-edged convex | 260 | Flat | 100 | 1.5 | 5 | 5 | 5 |
| Com. Ex. 1 | Flat | 170 | Flat | 140 | 8.0 | 5 | 5 | 4 |
| Com. Ex. 2 | Flat | 170 | Flat | 140 | 1.5 | 1 | 5 | 1 |

The ink inlet is formed of high-density polyethylene having a softening point of 122° C.

The heat-sealing heads are coated with a fluorine-containing resin.

<Ink Leakage>

A weight of 3 kgs was placed on each of the sealed bags in Examples 1 to 5 and Comparative Examples 1 to 2, and the ink inlet was observed to evaluate the ink leakage and grade that into 5 grades. The practical level is not less than 3.

<Sticky Resin>

The sticky resin was also graded into 5 grades. The larger the better.

<Defective Sealing>

The defective sealed points were counted. The larger the better.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A method of sealing a container, comprising:

filling a substance into a bag that includes a cylindrical inlet formed of a resin material;

sandwiching the cylindrical inlet between a contact edge of a first heat-sealing head and a contact edge of a second heat-sealing head, at least one of the contact edge of the first heat-sealing head or the contact edge of the second heat-sealing head being either concave or convex, each of the first and second heat-sealing heads being tapered toward the respective contact edge; and deforming the cylindrical inlet by applying heat from the first and second heat-sealing heads to the cylindrical inlet such that the cylindrical inlet is sealed.

2. The method of claim 1, wherein both the contact edge of the first heat-sealing head and the contact edge of a second heat-sealing head are concave.

3. The method of claim 1, wherein one of the contact edge of the first heat-sealing head or the contact edge of the second heat-sealing head is concave and the other is flat.

4. The method of claim 1, wherein the at least one of the contact edge of the first heat-sealing head or the contact edge of the second heat-sealing head is convex.

5. The method of claim 4, wherein one of the contact edge of the first heat-sealing head or the contact edge of the second heat-sealing head is convex and the other is flat.

6. The method of claim 1, wherein one of the contact edge of the first heat-sealing head or the contact edge of the second heat-sealing head is concave and the other is convex.

7. The method of claim 1, wherein each of the first and second heat-sealing heads is tapered toward the respective contact edge at an inclined angle of from 30 to 45°.

8. The method of claim 1, wherein the first and second heat-sealing heads have a difference in temperature of from 10 to 240° C. at the contact edges.

9. The method of claim 1, wherein each of the first and second heat-sealing heads includes a composite surface including a water-repellent resin.

10. The method of claim 9, wherein the water-repellent resin includes fluorine.

11. The method of claim 10, wherein the water-repellent resin includes nickel.

12. The method of claim 1, wherein the cylindrical inlet is not cooled after sealed.

13. The method of claim 1, wherein the cylindrical inlet is formed of a resin having a softening point of from 100 to 130° C.

14. The method of claim 1, further comprising pre-heating the first and second heat-sealing heads prior to sandwiching the cylindrical inlet.

15. The method of claim 14, wherein the pre-heating the first and second heat-sealing heads includes heating the first heat-sealing head to a first temperature and heating the second heat-sealing head to a second temperature.

16. The method of claim 15, wherein the first temperature is between 10 to 240° C. greater than the second temperature.

17. The method of claim 1, wherein the deforming the cylindrical inlet includes asymmetrically deforming the cylindrical inlet by applying heat from the first and second heat-sealing heads through thermal conductive heat transfer to the cylindrical inlet such that the cylindrical inlet is sealed.

18. The method of claim 17, wherein the cylindrical inlet includes an inner cylindrical surface and an outer cylindrical surface, and wherein the asymmetrically deforming the cylindrical inlet includes melting the cylindrical inlet so that both the inner cylindrical surface and the outer cylindrical surface are deformed.

19. The method of claim 17, wherein the cylindrical inlet is a hollow tube, and wherein the asymmetrically deforming the cylindrical inlet includes collapsing a portion of the hollow tube.

* * * * *